United States Patent
Kouketsu et al.

(10) Patent No.: US 9,508,476 B2
(45) Date of Patent: Nov. 29, 2016

(54) ELECTROMAGNETIC COIL, METHOD OF MANUFACTURING ELECTROMAGNETIC COIL, AND ELECTROMAGNETIC ACTUATOR

(71) Applicant: CKD CORPORATION, Komaki-shi, Aichi (JP)

(72) Inventors: Masayuki Kouketsu, Komaki (JP); Akihiro Ito, Komaki (JP); Kazutoshi Itoh, Komaki (JP); Takashi Hosono, Komaki (JP); Sadayoshi Muto, Komaki (JP)

(73) Assignee: CKD CORPORATION, Komaki-Shi, Aichi (JP)

( * ) Notice: Subject to any disclaimer, the term of this patent is extended or adjusted under 35 U.S.C. 154(b) by 0 days.

(21) Appl. No.: 14/812,922

(22) Filed: Jul. 29, 2015

(65) Prior Publication Data

US 2015/0332828 A1 Nov. 19, 2015

Related U.S. Application Data

(63) Continuation of application No. PCT/JP2014/069882, filed on Jul. 29, 2014.

(51) Int. Cl.
*H01F 7/00* (2006.01)
*H01F 5/06* (2006.01)
(Continued)

(52) U.S. Cl.
CPC ............ *H01F 5/06* (2013.01); *F16K 31/0675* (2013.01); *F16K 49/00* (2013.01); *H01F 5/00* (2013.01);
(Continued)

(58) Field of Classification Search
CPC .... H01F 5/06; H01F 41/0612; H01F 41/125; H01F 7/08; H01F 41/06; H01F 41/12; H01F 6/06; F16K 49/00; F16K 31/0675

USPC ........................................... 335/282
See application file for complete search history.

(56) References Cited

U.S. PATENT DOCUMENTS 4,746,425 A * 5/1988 Stickler .............. C02F 1/485
210/175
4,864,262 A * 9/1989 Deb ................... H01H 83/12
335/175
(Continued)

FOREIGN PATENT DOCUMENTS

CN 85201396 U 1/1986
CN 101310430 1/1986
(Continued)

OTHER PUBLICATIONS

Search Report dated Sep. 22, 2014 from International Application No. PCT/JP2014/069882.
(Continued)

*Primary Examiner* — Mohamad Musleh
*Assistant Examiner* — Lisa Homza
(74) *Attorney, Agent, or Firm* — Beyer Law Group LLP

(57) ABSTRACT

An electromagnetic coil includes a conductor winding 12a formed by winding a conductor 12b a plurality of times about a predetermined axis, and a ceramic layer 12c formed through thermal spraying on an axial end surface of the conductor winding 12a, and having a flattened surface. A maximal value t12 of thickness of the ceramic layer 12c is set to three times or less a maximal value t11 of depth of the recesses formed at the surface of turns of the conductor 12b at the axial end surface.

13 Claims, 9 Drawing Sheets

(51) Int. Cl.
*H01F 41/12* (2006.01)
*F16K 49/00* (2006.01)
*F16K 31/06* (2006.01)
*H01F 7/08* (2006.01)
*H01F 5/00* (2006.01)
*H01J 35/14* (2006.01)

(52) U.S. Cl.
CPC .............. *H01F 7/08* (2013.01); *H01F 41/064* (2016.01); *H01F 41/125* (2013.01); *H01J 35/14* (2013.01); *H01J 2235/087* (2013.01); *Y10T 29/49073* (2015.01); *Y10T 137/6416* (2015.04)

(56) References Cited

U.S. PATENT DOCUMENTS

| | | | |
|---|---|---|---|
| 4,909,079 A | 3/1990 | Nishimura et al. | |
| 5,008,549 A | 4/1991 | Crewe | |
| 5,525,583 A * | 6/1996 | Aized | H01F 6/02 29/599 |
| 5,625,332 A * | 4/1997 | Kamo | H01L 39/143 174/125.1 |
| 6,144,280 A | 11/2000 | Amada et al. | |
| 6,331,810 B1 * | 12/2001 | Jung | B66C 1/04 269/8 |
| 6,449,830 B1 | 9/2002 | Amada et al. | |
| 6,972,655 B2 * | 12/2005 | Tobias | H01F 7/06 336/55 |
| 8,004,378 B2 * | 8/2011 | Wanner | F02N 15/067 335/266 |
| 2002/0190832 A1 | 12/2002 | Amada et al. | |
| 2006/0170525 A1 | 8/2006 | Urano et al. | |
| 2009/0045683 A1 | 2/2009 | Vermeulen et al. | |
| 2013/0069478 A1 * | 3/2013 | Hamer | H02K 3/30 310/215 |

FOREIGN PATENT DOCUMENTS

| | | |
|---|---|---|
| JP | 56-147413 | 11/1981 |
| JP | 1-100901 | 4/1989 |
| JP | 2000-232016 | 8/2000 |
| JP | 2013-012645 | 1/2013 |
| JP | 2013-229211 | 11/2013 |
| KR | 1019990029592 | 4/1990 |
| KR | 1020080064217 | 7/2008 |
| KR | 1020110115847 | 10/2011 |
| TW | 348256 B | 10/1986 |
| TW | 397997 B | 8/1987 |
| TW | 200629307 A | 8/1995 |

OTHER PUBLICATIONS

Written Opinion dated Sep. 22, 2014 from International Application No. PCT/JP2014/069882.

* cited by examiner

ELECTROMAGNETIC COIL, METHOD OF MANUFACTURING ELECTROMAGNETIC COIL, AND ELECTROMAGNETIC ACTUATOR

CLAIM OF PRIORITY

This application is a Continuation of International Patent Application No. PCT/JP2014/069882, filed on Jul. 29, 2014, which claims priority to Japanese Patent Application No. 2013-161360, filed on Aug. 2, 2013, each of which is hereby incorporated by reference.

BACKGROUND OF THE INVENTION

1. Field of the Invention

The present invention relates to an electromagnetic coil for use in an electromagnetic actuator and others.

2. Description of the Related Art

In a known electromagnetic coil of this type, cooling plates made of metal are disposed at axial positions along the axial direction of a conductor winding formed by winding an electrically conductive wire a plurality of times, for example, as described in Japanese Patent Application Laid-Open (kokai) No. 2013-12645. In the electromagnetic coil described in Patent Document 1, the front and back sides of the cooling plates are covered with respective high-thermal-conduction insulating members in the form of ceramic layers.

In the electromagnetic coil described in Japanese Patent Application Laid-Open (kokai) No. 2013-12645, at an axial end surface of the conductor winding, recesses are formed at the surface of turns of the electrically conductive wire wound a plurality of times, or some turns of the electrically conductive wire protrude. Thus, when the cooling plates are brought in contact with the respective axial end surfaces of the conductor winding, contact between the end surfaces and the cooling plates (more specifically, the high-thermal-conduction insulating members) becomes insufficient, resulting in a deterioration in heat radiation from the conductor winding.

BRIEF DESCRIPTION OF THE INVENTION

The present invention has been conceived to solve the above problem, and the primary object of the present invention is to improve heat radiation from axial end surfaces of an electromagnetic coil.

Embodiments of the invention for solving the above problem, and actions and effects thereof are described below.

A first aspect of the present invention provides an electromagnetic coil characterized by comprising a conductor winding formed by winding a conductor a plurality of times about a predetermined axis; and a ceramic layer formed through thermal spraying on an end surface, with respect to a direction of the predetermined axis, of the conductor winding, and having a flattened surface.

According to the above configuration, the conductor winding is formed by winding the conductor a plurality of times about the predetermined axis. At an end surface of the conductor winding with respect to the direction of the predetermined axis (hereinafter called the "axial end surface"), recesses are formed at the surface of turns of the conductor, and some turns of the conductor protrude. Thus, for example, when a cooling plate is brought into contact with the axial end surface of the conductor winding, heat transfer from the conductor winding to the cooling play deteriorates.

In this connection, the ceramic layer is formed on the axial end surface of the conductor winding through thermal spraying. Thus, irregularities of the axial end surface are embedded in the ceramic layer, whereby heat can be efficiently transferred from the axial end surface to the ceramic layer. Furthermore, the surface of the ceramic layer is flattened. Thus, by means of the cooling plate, for example, being brought into contact with the flattened surface of the ceramic layer, heat can be efficiently transferred from the ceramic layer to the cooling plate. Therefore, heat radiation from the axial end surface of the electromagnetic coil can be improved.

Furthermore, since the ceramic layer solidifies the axial end surface of the conductor winding, the electromagnetic coil can be improved in strength. Notably, since ceramic is generally an electrical insulator, even though ceramic is thermally sprayed on turns of the conductor, there can be prevented occurrence of short circuit between turns of the conductor.

According to a second aspect of the present invention, a maximal value of thickness of the ceramic layer is set to three times or less a maximal value of depth of the recesses formed at the surface of turns of the conductor at the axial end surface.

The thicker the ceramic layer, the more reliably the turns of the conductor at the axial end surface can be electrically insulated, whereas the thinner the ceramic layer, the greater the improvement in the heat transfer from the axial end surface to the cooling plate. In this connection, according to the above configuration, the maximal value of thickness of the ceramic layer is set to three times or less the maximal value of depth of the recesses formed at the surface of turns of the conductor at the axial end surface. Thus, while the ceramic layer electrically insulates turns of the conductor at the axial end surface, there can be restrained a deterioration in heat transfer from the axial end surface to the cooling plate.

According to a third aspect of the present invention, a maximal value of thickness of the ceramic layer is set to about twice a maximal value of depth of the recesses formed at the surface of turns of the conductor at the axial end surface.

According to the above configuration, the maximal value of thickness of the ceramic layer is set to about twice the maximal value of depth of the recesses formed at the surface of turns of the conductor at the axial end surface. Thus, the thickness of the ceramic layer can be minimized to electrically insulate turns of the conductor at the axial end surface, whereby heat transfer from the axial end surface to the cooling plate can be improved.

A fourth aspect of the present invention provides a method of manufacturing an electromagnetic coil characterized by comprising a step of forming a conductor winding by winding a conductor a plurality of times about a predetermined axis; a step of forming a ceramic layer on an end surface of the conductor winding with respect to a direction of the predetermined axis by thermally spraying ceramic on the axial end surface; and a step of flattening a surface of the ceramic layer by grinding.

According to the above step, the conductor is wound a plurality of times about the predetermined axis, thereby forming the conductor winding. At this time, at the axial end surface of the conductor winding, recesses are formed at the surface of turns of the conductor, and some turns of the conductor protrude.

Thus, ceramic is thermally sprayed on the axial end surface of the conductor winding to form the ceramic layer. By this procedure, irregularities of the axial end surface are embedded in the ceramic layer, and the ceramic layer electrically insulates turns of the conductor at the axial end surface. At this stage, the surface of the ceramic layer also has irregularities as a result of influence of irregularities of the axial end surface. By means of the surface of the ceramic layer being flattened by grinding, the electromagnetic coil of the first aspect of the present invention can be yielded.

A fifth aspect of the present invention provides an electromagnetic actuator characterized by comprising an electromagnetic coil according to any one of the first to third aspects of the present invention, and a cooling member disposed in such a manner as to face the ceramic layer.

According to the above configuration, the electromagnetic actuator comprises the electromagnetic coil according to any one of the first to third aspects of the present invention, and the cooling member is disposed in such a manner as to face the ceramic layer of the electromagnetic coil. Thus, by means of the cooling member being brought into contact with the flattened surface of the ceramic layer, heat can be efficiently transferred from the ceramic layer to the cooling member, whereby heat radiation from the axial end surface of the electromagnetic coil can be improved.

According to a sixth aspect of the present invention, an adhesive layer is formed between the ceramic layer and the cooling member, and the ceramic layer is higher in thermal conductivity than the adhesive layer.

According to the above configuration, the adhesive layer is formed between the ceramic layer and the cooling member, whereby the adhesive layer bonds the ceramic layer and the cooling member. Since the ceramic layer is higher in thermal conductivity than the adhesive layer, thinning the adhesive layer is more advantageous than thinning the ceramic layer in terms of improvement of heat transfer.

In this connection, since the surface of the ceramic layer is flattened, there is no need to embed irregularities of the ceramic layer in the adhesive layer, whereby an increase in thickness of the adhesive layer can be restrained. As a result, even in the case where the ceramic layer and the cooling member are bonded together by means of the adhesive layer, heat can be efficiently transferred from the axial end surface of the conductor winding to the cooling member.

DETAILED DESCRIPTION OF EMBODIMENTS OF THE INVENTION

First Embodiment

A first embodiment will be described with reference to the drawings. The present embodiment embodies a solenoid valve for opening and closing a flow passage of fluid.

Figure 1:
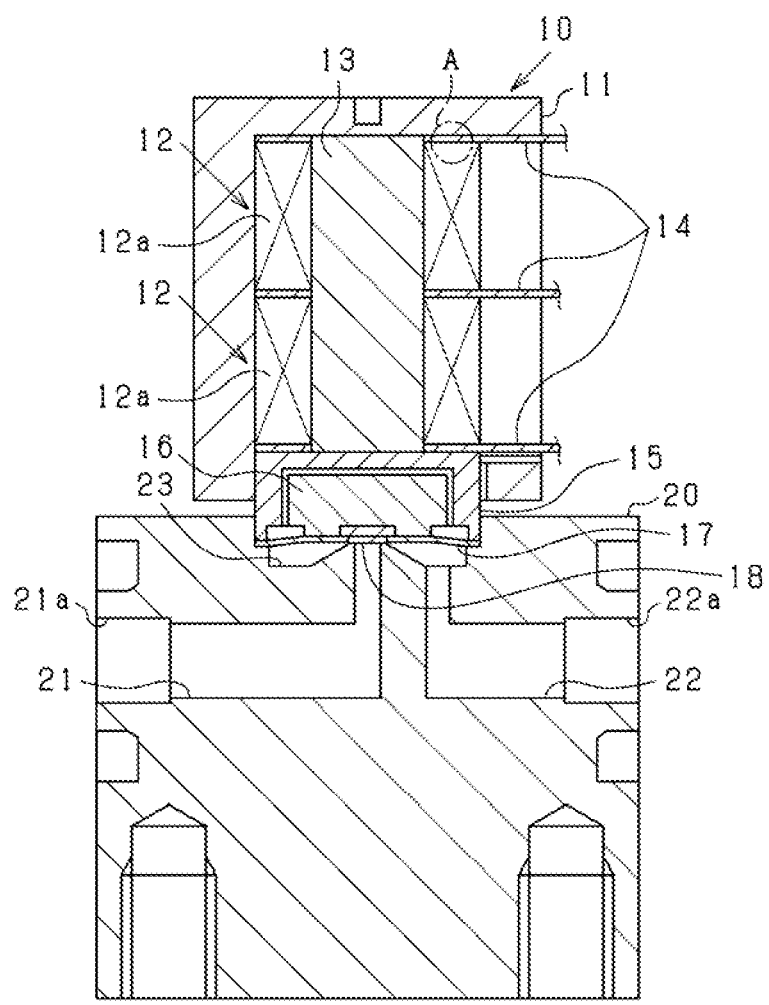
FIG. 1 is a sectional view showing a solenoid valve and a flow passage block.

As shown in FIG. 1, a flow passage block 20 is formed into rectangular parallelepiped form of metal such as stainless steel or aluminum. The flow passage block 20 has an inflow passage 21 and an outflow passage 22 formed therein. The flow passage block 20 has a valve chamber 23 formed at an upper portion thereof. The valve chamber 23 opens at the upper surface of the flow passage block 20. One end of the inflow passage 21 opens at a side surface of the flow passage block 20, and the other end of the inflow passage 21 communicates with the valve chamber 23. The inflow passage 21 opens at the side surface through an inflow port 21a. One end of the outflow passage 22 opens at a side surface of the flow passage block 20, and the other end of the outflow passage 22 communicates with the valve chamber 23. The outflow passage 22 opens at the side surface through an outflow port 22a. Pipe lines or the like through which fluid flows are connected to the inflow port 21a and the outflow port 22a, respectively.

A solenoid valve 10 is mounted on the upper surface of the flow passage block 20. The solenoid valve 10 (electromagnetic actuator) includes a housing 11, electromagnetic coils 12, a stationary iron core 13, heat pipes 14, a guide member 15, a movable iron core 16, a spring member 17, and a seal member 18.

The housing 11 is formed into cylindrical form of ferromagnet such as iron. The stationary iron core 13 is formed into circular columnar form of ferromagnet such as iron. The electromagnetic coil 12 includes a conductor winding 12a formed into cylindrical form by winding a round wire conductor a plurality of times around the outer circumference of the stationary iron core 13. The surface of the round wire conductor is coated with an insulator. Two electromagnetic coils 12 are provided tandem in the axial direction of the stationary iron core 13. The axis of the stationary iron core 13 and the axis of the electromagnetic coil 12 correspond to the predetermined axis.

The heat pipe 14 (cooling member) includes an annular portion which can be fitted to the outer circumference of the stationary iron core 13, and a pipe portion connected to the annular portion. The heat pipe 14 is a publicly known one which is formed of a material having high thermal conductivity, such as copper or aluminum, and in which a volatile liquid is confined. The annular portion of the heat pipe 14 is fitted to the outer circumference of the stationary iron core 13. The heat pipe 14 is provided on the upper electromagnetic coil 12, between the upper electromagnetic coil 12 and the lower electromagnetic coil 12, and under the lower electromagnetic coil 12.

The guide member 15 is formed into closed-bottomed cylindrical form of ferromagnet such as iron. The housing 11 houses the stationary iron core 13, two electromagnetic coils 12, the annular portions of three heat pipes 14, and an upper portion of the guide member 15. The upper surface (bottom surface) of the guide member 15 is joined to the lower surface of the stationary iron core 13, and the outer circumferential surface of the guide member 15 is joined to the inner circumferential surface of the housing 11.

The movable iron core 16 is formed into circular columnar form of ferromagnet such as iron. The movable iron core 16 is slightly smaller than a cylindrical space formed in the guide member 15. The seal member 18 (valve element) is formed into disc form of an elastic material such as rubber. The spring member 17 is formed into disc form of a non-magnetic material such as aluminum.

The seal member 18 is attached to the lower surface of the movable iron core 16 at the center, and the spring member 17 is attached to the outer circumference of the seal member 18. An outer edge portion of the spring member 17 is held between the flow passage block 20 and the guide member 15. The movable iron core 16 is disposed within the guide member 15. The seal member 18 faces a region where the inflow passage 21 communicates with the valve chamber 23. The spring member 17 urges the seal member 18 to shut off communication between the inflow passage 21 and the valve chamber 23.

In such a configuration, when electric current is applied to the electromagnetic coils 12, the movable iron core 16 (seal member 18) is attracted toward the stationary iron core 13 against urging force of the spring member 17. Accordingly, the inflow passage 21 and the valve chamber 23 communicate with each other, and fluid flows from the inflow passage 21 to the outflow passage 22 through the valve chamber 23. When electric current flowing to the electromagnetic coils 12 is shut off, the spring member 17 urges the seal member 18 in a direction opposite the stationary iron core 13. Accordingly, the seal member 18 shuts off communication between the inflow passage 21 and the valve chamber 23.

When electric current is applied to the electromagnetic coils 12, the conductor windings 12a generate heat. Heat of the electromagnetic coils 12 is transferred from the end surfaces, with respect to the axial direction (axial end surfaces), of the conductor windings 12a to the annular portions of the heat pipes 14. Also, heat of the electromagnetic coils 12 is transferred from the inner circumferential surfaces of the conductor windings 12a to the annular portions of the heat pipes 14 through the stationary iron core 13 and the housing 11.

Meanwhile, at an axial end surface of each of the conductor windings 12a, recesses are formed at the surface of turns of the round wire conductor wound a plurality of times, and some turns of the round wire conductor protrude. Thus, when the corresponding annular portion of the heat pipe 14 is brought into contact with the axial end surface of the conductor winding 12a, heat transfer from the conductor winding 12a to the annular portion of the heat pipe 14 deteriorates.

Figure 2:
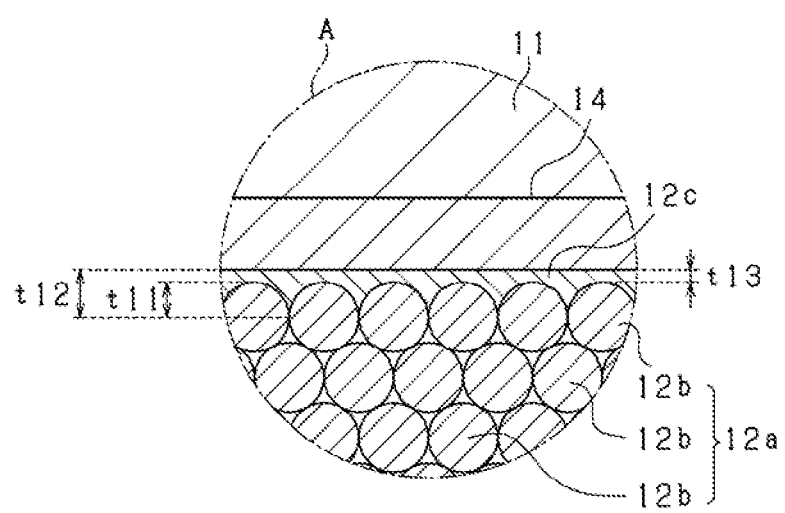
FIG. 2 is an enlarged sectional view of region A.

In this connection, according to the present embodiment, a ceramic layer is formed on an axial end surface of each of the conductor windings 12a by means of thermal spraying. FIG. 2 is an enlarged sectional view of region A, partially showing an axial end surface of the conductor winding 12a and its periphery.

As shown in FIG. 2, at the axial end surface of the conductor winding 12a formed by winding the round wire conductor 12b a plurality of times, recesses are formed at the surface of turns of the conductor 12b. The ceramic layer 12c is formed on the axial end surface of the conductor winding 12a through thermal spraying of alumina so as to fill the recesses at the surface of turns of the conductor 12b. Thus, the axial end surface of the conductor winding 12a is covered with the ceramic layer 12c. Alumina to be used has a purity of 98% or more. The surface of the ceramic layer 12c is flattened and finished to predetermined smoothness. Particularly, since alumina has a purity of 98% or more, the surface of the ceramic layer 12c can be finished very smoothly.

A maximal value t12 of thickness of the ceramic layer 12c is set to about 1.5 times (in other words, three times or less) a maximal value t11 of depth of the recesses formed at the surface of adjacent turns of the conductor 12b. The thicker the ceramic layer 12c, the more reliably the turns of the conductor 12b at the axial end surface of the conductor winding 12a can be electrically insulated, whereas the thinner the ceramic layer 12c, the more the heat transfer from the axial end surface to an annular portion of the heat pipe 14 improves. Also, a minimal value t13 of thickness of the ceramic layer 12c is set smaller than the maximal value t11 of depth of the recesses.

An annular portion of the heat pipe 14 is brought in contact with the surface of the ceramic layer 12c. The surface of an annular portion of the heat pipe 14 is also finished to predetermined smoothness. Thus, a contact area between the surface of the ceramic layer 12c and the surface of an annular portion of the heat pipe 14 becomes large.

Figure 3:
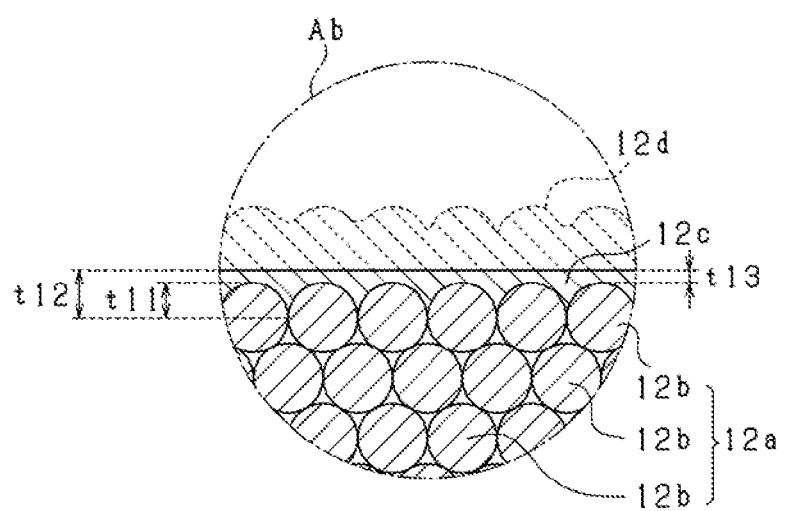
FIG. 3 is an enlarged sectional view showing how region Ab corresponding to region A is formed.

The thus-configured electromagnetic coil 12 is manufactured by the following method. FIG. 3 is an enlarged sectional view showing how region Ab corresponding to region A is formed.

First, the round wire conductor 12b is wound around the stationary iron core 13 a plurality of times, thereby forming the conductor winding 12a.

Subsequently, alumina is thermally sprayed onto an axial end surface of the conductor winding 12a to form the ceramic layer 12d. Thus, irregularities of the axial end surface are embedded in the ceramic layer 12d, and the ceramic layer 12d electrically insulates turns of the conductor 12b at the axial end surface. In the present embodiment, an insulator which covers the surface of the conductor 12b also electrically insulates the conductor 12b. At this stage, the surface of the ceramic layer 12d also has irregularities as a result of influence of irregularities of the axial end surface. The thickness of the ceramic layer 12d is about three times the maximal value t11 of depth of the recesses formed at the surface of turns of the conductor 12b. Notably, that portion of the ceramic layer 12d which is located toward the conductor winding 12a is to become the ceramic layer 12c.

Subsequently, the surface of the ceramic layer 12d is flattened by grinding, leaving only the ceramic layer 12c. By this procedure, the maximal value t12 of thickness of the ceramic layer 12c becomes about 1.5 times the maximal value t11 of depth of the recesses. Furthermore, the surface of the ceramic layer 12c is finished through grinding to predetermined smoothness. Through execution of the above steps, the electromagnetic coil 12 is manufactured.

The present embodiment described above in detail has the following advantages.

The ceramic layer 12c is formed through thermal spraying on an axial end surface of the conductor winding 12a. Thus, irregularities of the axial end surface are embedded in the ceramic layer 12c, whereby heat can be efficiently transferred from the axial end surface to the ceramic layer 12c. Also, the surface of the ceramic layer 12c is flattened. Thus, by means of an annular portion of the heat pipe 14 being brought into contact with the flattened surface of the ceramic layer 12c, heat can be efficiently transferred from the ceramic layer 12c to the annular portion of the heat pipe 14. Therefore, heat radiation from the axial end surface of the electromagnetic coil 12 can be improved.

Since the ceramic layer 12c solidifies an axial end surface of the conductor winding 12a, the electromagnetic coil 12 can be improved in strength.

The maximal value t12 of thickness of the ceramic layer 12c is set to about 1.5 times (in other words, three times or less) the maximal value t11 of depth of the recesses formed at the surface of turns of the conductor 12b at the axial end surface. Thus, while the ceramic layer 12c electrically insulates turns of the conductor 12b at the axial end surface, there can be restrained a deterioration in heat transfer from the axial end surface to an annular portion of the heat pipe 14. Furthermore, since the ceramic layer 12c is formed of alumina, which is a non-magnetic material, and is minimized in thickness, there can be restrained influence of the ceramic layer 12c on magnetic flux which the electromagnetic coil 12 generates.

Second Embodiment

Figure 4:
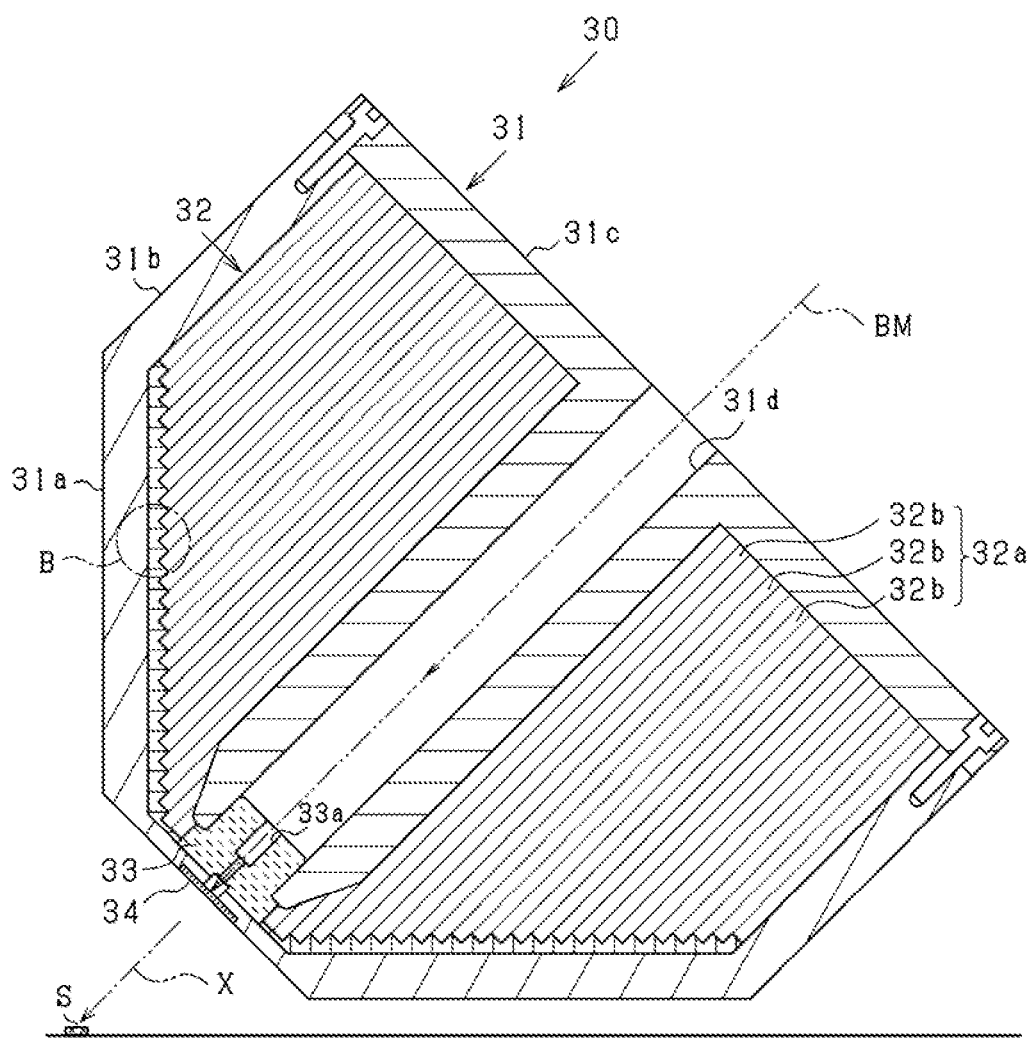
FIG. 4 is a sectional view showing an X-ray generator.

A second embodiment will be described with reference to the drawings. The present embodiment embodies an X-ray generator. FIG. 4 is a sectional view showing the X-ray generator 30.

As shown in FIG. 4, an X-ray generator 30 (electromagnetic actuator) includes a housing 31 (cooling member), an electromagnetic coil 32, an aperture member 33, and a target 34.

The housing 31 (cooling member) is formed of ferromagnet such as iron and has a conical distal end portion 31a, an outer circumferential portion 31b in large-diameter cylinder form, a bottom portion 31c in disc form, and an inner circumferential portion 31d in small-diameter tube form. The housing 31 forms a magnetic circuit.

The electromagnetic coil 32 includes a conductor winding 32a formed into cylindrical form by winding a tape-like (film-like) conductor 32b a plurality of times around the outer circumference of the inner circumferential portion 31d of the housing 31. The surface of the tape-like conductor 32b is coated with an insulator. A distal end portion of the conductor winding 32a is formed into conical form corresponding to the shape of the distal end portion 31a of the housing 31. Notably, the axis of the inner circumferential portion 31d of the housing 31 and the axis of the electromagnetic coil 32 correspond to the predetermined axis.

The aperture member 33 is formed into circular columnar form of a non-magnetic material such as brass or copper. The aperture member 33 has an electron beam BM passage 33a at the center. The aperture member 33 is attached to the distal end of the inner circumferential portion 31d of the housing 31. The target 34 is attached to the distal end surface of the distal end portion 31a of the housing 31. The target 34 is formed of tungsten or the like and generates X rays as a result of impingement of the electron beam BM thereon.

In the above configuration, when electric current is applied to the electromagnetic coil 32, magnetic flux is generated and passes through a magnetic circuit formed by the housing 31. Thus, during passage through the aperture member 33, the electron beam BM is focused, and the focused electron beam BM impinges on the target 34. X rays generated from the target 34 are radiated onto a sample S.

Also, when electric current is applied to the electromagnetic coil 32, the conductor winding 32a generates heat. Heat of the electromagnetic coil 32 is transferred from the conductor winding 32a to the housing 31. The housing 31 is cooled by unillustrated means.

Meanwhile, at an axial end surface of the conductor winding 32a, recesses are formed at the surface of turns of the tape-like conductor 32b wound a plurality of times, and some turns of the tape-like conductor 32b protrude. Particularly, since a distal end portion of the conductor winding 32a is formed into conical form, recesses are apt to be formed at the surface of adjacent turns of the conductor 32b. Thus, when the distal end portion 31a of the housing 31 is brought into contact with the axial end surface of the conductor winding 32a, thermal transfer from the conductor winding 32a to the distal end portion 31a of the housing 31 deteriorates.

Figure 5:
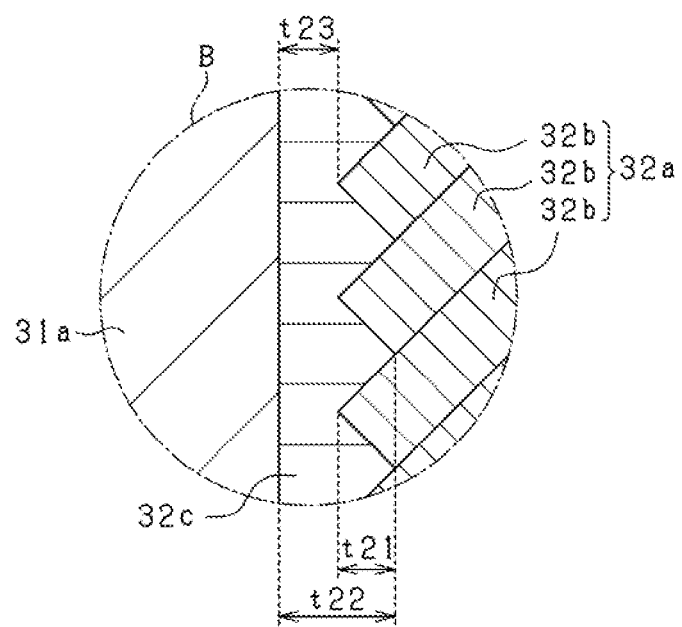
FIG. 5 is an enlarged sectional view of region B.

In this connection, in the present embodiment, a ceramic layer is formed by thermal spraying on the axial end surface (conical surface) of the conductor winding 32a. FIG. 5 is an enlarged sectional view of region B, partially showing the axial end surface of the conductor winding 32a and its periphery.

As shown in FIG. 5, at the axial end surface of the conductor winding 32a formed by winding the tape-like conductor 32b a plurality of times, recesses are formed at the surface of turns of the conductor 32b. The ceramic layer 32c is formed on the axial end surface of the conductor winding 32a through thermal spraying of alumina so as to fill the recesses at the surface of turns of the conductor 32b. Thus, the axial end surface of the conductor winding 32a is covered with the ceramic layer 32c. The conical surface of the ceramic layer 32c is flattened and finished to predetermined smoothness.

A maximal value t22 of thickness of the ceramic layer 32c is set to about twice (in other words, three times or less) a maximal value t21 of depth of the recesses formed at the surface of adjacent turns of the conductor 32b. Also, a minimal value t23 of thickness of the ceramic layer 32c is substantially equal to a minimal value t21 of depth of the recesses.

The distal end portion 31a of the housing 31 is brought into contact with the surface of the ceramic layer 32c. The distal end portion 31a of the housing 31 is also finished to predetermine smoothness.

Figure 6:
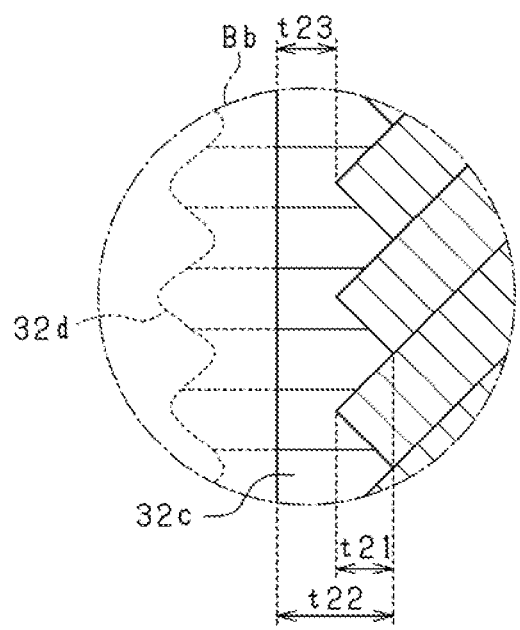
FIG. 6 is an enlarged sectional view showing how region Bb corresponding to region B is formed.

The thus-configured electromagnetic coil 32 is manufactured by the following method. FIG. 6 is an enlarged sectional view showing how region Bb corresponding to region B is formed.

First, the tape-like conductor 12b is wound around the inner circumferential portion 31d of the housing 31 a plurality of times, thereby forming the conductor winding 32a.

Subsequently, alumina is thermally sprayed onto the axial end surface (conical surface) of the conductor winding 32a to form the ceramic layer 32d. At this stage, the surface of the ceramic layer 32d also has irregularities as a result of influence of irregularities of the axial end surface. The thickness of the ceramic layer 32d is about three times the maximal value t21 of depth of the recesses formed at the surface of turns of the conductor 32b. Notably, that portion of the ceramic layer 32d which is located toward the conductor winding 32a is to become the ceramic layer 32c.

Subsequently, the conical surface (curved surface) of the ceramic layer 32d is flattened by grinding, leaving only the ceramic layer 32c. By this procedure, the maximal value t22 of thickness of the ceramic layer 32c becomes about twice the maximal value t21 of depth of the recesses. Furthermore, the surface of the ceramic layer 32c is finished through grinding to predetermined smoothness. Through execution of the above steps, the electromagnetic coil 32 is manufactured.

The present embodiment described above in detail has the following advantages.

The ceramic layer 12c is formed through thermal spraying on the axial end surface (conical surface) of the conductor winding 32a. Thus, irregularities of the axial end surface are embedded in the ceramic layer 32c, whereby heat can be efficiently transferred from the axial end surface to the ceramic layer 32c. Also, the conical surface (curved surface) of the ceramic layer 12c is flattened. Thus, by means of the distal end portion 31a of the housing 31 being brought into contact with the flattened surface of the ceramic layer 12c, heat can be efficiently transferred from the ceramic layer 32c to the distal end portion 31a of the housing 31. Therefore, heat radiation from the axial end surface of the electromagnetic coil 32 can be improved.

Since the ceramic layer 12c solidifies the axial end surface of the conductor winding 32a, the electromagnetic coil 32 can be improved in strength.

The maximal value t22 of thickness of the ceramic layer 32c is set to about twice the maximal value t21 of depth of the recesses formed at the surface of turns of the conductor 32b at the axial end surface. Thus, while the ceramic layer 32c electrically insulates turns of the conductor 32b at the axial end surface, there can be restrained a deterioration in heat transfer from the axial end surface to the distal end portion 31a of the housing 31. Furthermore, since the ceramic layer 32c is formed of alumina, which is a non-magnetic material, and is minimized in thickness, there can be restrained influence of the ceramic layer 32c on magnetic flux which the electromagnetic coil 32 generates.

The above embodiments can be modified as follows. The same members as those of the embodiments are denoted by the same reference numerals, and repeated description thereof is omitted.

Figure 7:
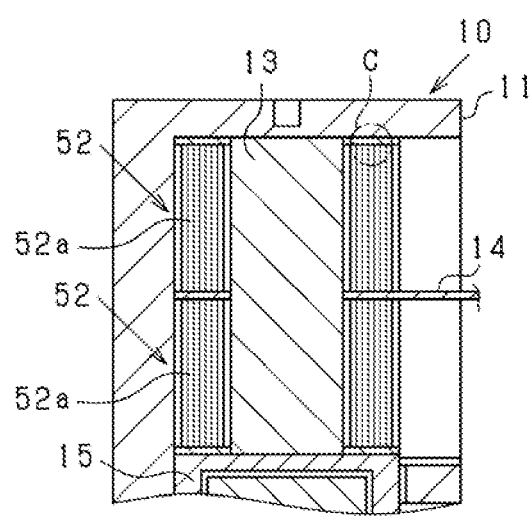
FIG. 7 is a sectional view showing a modified solenoid valve.
Figure 8:
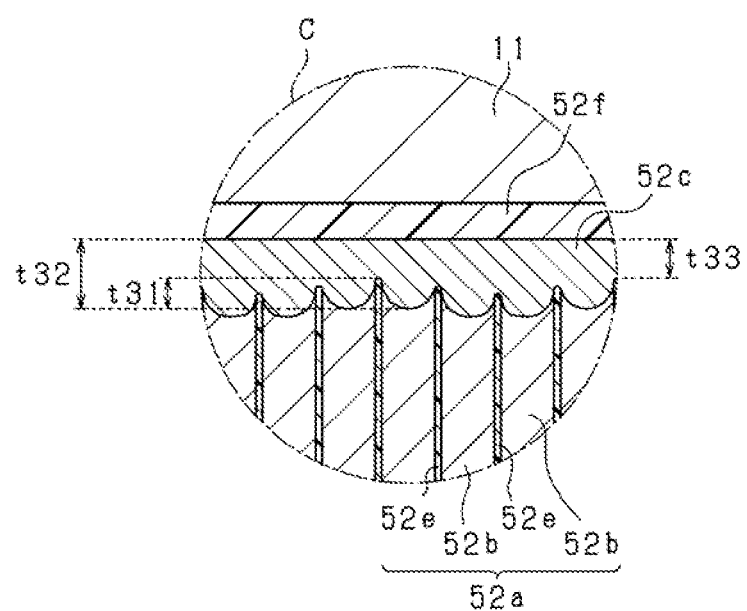
FIG. 8 is an enlarged sectional view of region C.

As shown in FIGS. 7 and 8, a conductor winding 52a of an electromagnetic coil 52 can be formed of a tape-like (film-like) conductor 52b and a tape-like (film-like) adhesive layer 52e. In this case, the surface of the tape-like conductor 52b is not coated with an insulator, and adjacent turns of the conductor 52b are bonded together and electrically insulated from each other by the adhesive layer 52e. The adhesive layer 52e is formed of an insulator such as resin. Notably, the adhesive layer 52e may be composed of a tape-like insulator and a tape-like adhesive.

A ceramic layer 52c is formed on the axial end surface of the conductor winding 52a through thermal spraying of alumina so as to fill the recesses at the surface of turns of the conductor 52b. Thus, the axial end surface of the conductor winding 52a is covered with the ceramic layer 52c. Since alumina is an electrical insulator, even though alumina is thermally sprayed on turns of the conductor 52b, there can be prevented occurrence of short circuit between turns of the conductor 52b. The conical surface of the ceramic layer 52c is flattened and finished to predetermined smoothness. Since alumina has a purity of 98% or more, the surface of the ceramic layer 52c can be finished very smoothly.

A maximal value t32 of thickness of the ceramic layer 52c is set to about twice (in other words, three times or less) a maximal value t31 of depth of the recesses formed at the surface of adjacent turns of the conductor 52b. Also, a minimal value t33 of thickness of the ceramic layer 52c is substantially equal to the maximal value t31 of depth of the recesses.

The surface of the ceramic layer 52c and the surface of the housing 11 (cooling member) are bonded by means of an adhesive layer 52f. The housing 11 is cooled by unillustrated means. The thickness of the adhesive layer 52f is smaller than the maximal value t32 of thickness of the ceramic layer 52c. The ceramic layer 52c is higher in thermal conductivity than the adhesive layer 52f.

Figure 9:
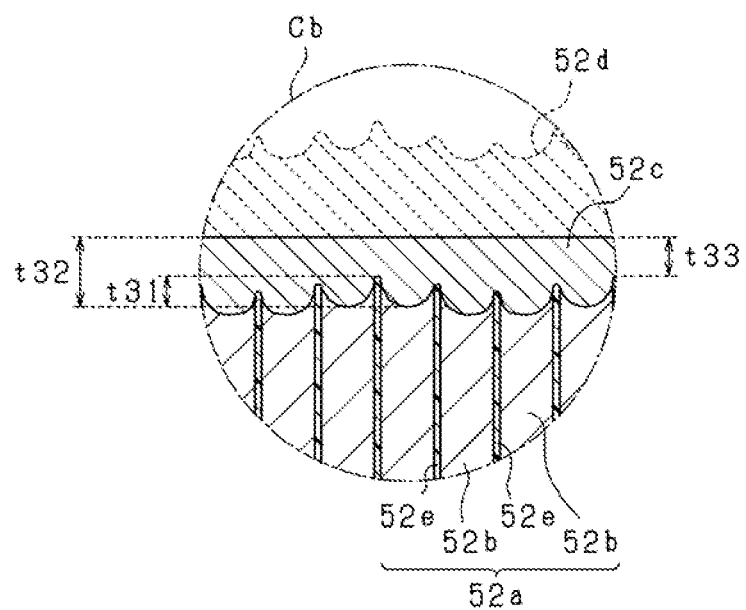
FIG. 9 is an enlarged sectional view showing how region Cb corresponding to region C is formed.

FIG. 9 is an enlarged sectional view showing how region Cb corresponding to region C is formed. Alumina is thermally sprayed onto the axial end surface of the conductor winding 52a to form a ceramic layer 52d. The thickness of the ceramic layer 52d is about four times the maximal value t31 of depth of the recesses formed at the surface of turns of the conductor 52b. Subsequently, the surface of the ceramic layer 52d is flattened by grinding, leaving only the ceramic layer 52c. Notably, that portion of the ceramic layer 52d which is located toward the conductor winding 52a is to become the ceramic layer 52c.

According to the above configuration, the maximal value t32 of thickness of the ceramic layer 52c is set to about twice the maximal value t31 of depth of the recesses formed at the surface of turns of the conductor 52b at the axial end surface. Thus, the thickness of the ceramic layer 52c can be minimized to electrically insulate turns of the conductor 52b at the axial end surface, whereby heat transfer from the axial end surface to the housing 11 can be improved. Particularly, since the conductor 52b is formed into tape form and is not coated with an insulator, heat can be efficiently transferred from the axial end surface of the conductor winding 52a (end surface of turns of the conductor 52b) to the ceramic layer 52c. In this case, preferably, the axial length of the conductor winding 52a (electromagnetic coil 52) is one-half or less the diameter of the conductor winding 52a, desirably one-third or less the diameter of the conductor winding 52a. Through employment of such an axial length of the conductor winding 52a, an axial distance from an axially intermediate portion of the conductor winding 52a to the ceramic layer 52c becomes short, so that heat can be more efficiently transferred to the ceramic layer 52c. Furthermore, since the ceramic layer 52c is formed of alumina, which is a non-magnetic material, and is minimized in thickness, there can be restrained influence of the ceramic layer 52c on magnetic flux which the electromagnetic coil 52 generates. Also, since the ceramic layer 52c solidifies the axial end surface of the conductor winding 52a, there can be restrained slippage between the tape-like conductor 52b and the adhesive layer 52e which are likely to slip on each other. Therefore, torsion of the electromagnetic coil 52 can be restrained, whereby the electromagnetic coil can be improved in strength. Particularly, in the case where the electromagnetic coil 52 is in circular columnar form, elliptic columnar form, or elongated-circular columnar form, strength against torsion can be effectively improved.

Since the ceramic layer 52c is higher in thermal conductivity than the adhesive layer 52f, thinning the adhesive layer 52f is more advantageous than thinning the ceramic layer 52c in terms of improvement of heat transfer. In this connection, since the surface of the ceramic layer 52c is flattened, there is no need to embed irregularities of the ceramic layer 52c in the adhesive layer 52f, whereby an increase in thickness of the adhesive layer 52f can be restrained. As a result, even in the case where the ceramic layer 52c and the housing 11 are bonded together by means of the adhesive layer 52f, heat can be efficiently transferred from the axial end surface of the conductor winding 52a to the housing 11.

In FIG. 2, in place of the round wire conductor 12b, a square wire conductor can be used.

The shapes of the conductor windings 12a and 52a are not limited to a cylindrical shape, but an elliptic cylindrical shape, a polygonal cylindrical shape, etc., can be employed.

The electromagnetic coils 12, 32, and 52 can be applied to other electromagnetic actuators.

The ceramic layers 12c, 32c, and 52c can be formed through thermal spraying of zirconia, titania, magnesia, or like ceramic.

What is claimed is:

1. An electromagnetic coil comprising:
a conductor winding formed by winding a conductor and an adhesive layer a plurality of times about a predetermined axis such that adjacent turns of the conductor are bonded together by the adhesive layer provided therebetween, the conductor winding having an axial end surface with respect to a direction of the predetermined axis, the axial end surface having irregularities; and
a ceramic layer formed through thermal spraying on the axial end surface, the ceramic layer having a flattened surface,
wherein the irregularities of the axial end surface, including portions of the adhesive layer, are embedded in the ceramic layer, and the flattened surface of the ceramic layer is formed on an opposite side of the irregularities.

2. An electromagnetic coil according to claim 1, wherein the ceramic layer is formed on the axial end surface of the conductor winding in such a manner as to fill recesses at the surface of turns of the conductor.

3. An electromagnetic coil according to claim 1, wherein the ceramic layer electrically insulates turns of the conductor at the axial end surface of the conductor winding.

4. An electromagnetic coil according to claim 1, wherein the ceramic layer solidifies the axial end surface of the conductor winding.

5. An electromagnetic coil according to claim 1, wherein the conductor is formed into a tape shape, the adhesive layer is a tape-like adhesive layer, and the adjacent turns of the conductor are electrically insulated from each other by means of the tape-like adhesive layer.

6. An electromagnetic coil according to claim 1, wherein a maximal value of thickness of the ceramic layer is set to three times or less a maximal value of depth of the recesses formed at the surface of turns of the conductor at the axial end surface.

7. An electromagnetic coil according to claim 1, wherein a maximal value of thickness of the ceramic layer is set to about twice a maximal value of depth of the recesses formed at the surface of turns of the conductor at the axial end surface.

8. An electromagnetic coil according to claim 1, wherein the conductor winding is formed by winding the conductor a plurality of times on an outer circumference of a stationary iron core.

9. An electromagnetic actuator characterized by comprising:
an electromagnetic coil including:
a conductor winding formed by winding a conductor and an adhesive layer a plurality of times about a predetermined axis such that adjacent turns of the conductor are bonded together by the adhesive layer provided therebetween, the conductor winding having an axial end surface with respect to a direction of the predetermined axis, the axial end surface having irregularities; and
a ceramic layer formed through thermal spraying on the axial end surface of the conductor winding so as to embed irregularities of the axial end surface, including portions of the adhesive layer, in the ceramic layer, the ceramic layer having a flattened surface on a side opposite of the irregularities; and
a cooling member disposed in such a manner as to face the flattened surface of the ceramic layer.

10. An electromagnetic actuator according to claim 9, wherein
an adhesive layer is formed between the ceramic layer and the cooling member so as to bond the ceramic layer and the cooling member, and
the ceramic layer is higher in thermal conductivity than the adhesive layer.

11. An electromagnetic actuator according to claim 9, wherein the ceramic layer and the cooling member are in contact with each other.

12. An electromagnetic actuator according to claim 9, wherein the cooling member is a housing of a solenoid valve.

13. An electromagnetic actuator according to claim 9, wherein the cooling member is a heat pipe in which a volatile liquid is confined.

* * * * *